Figure 1:
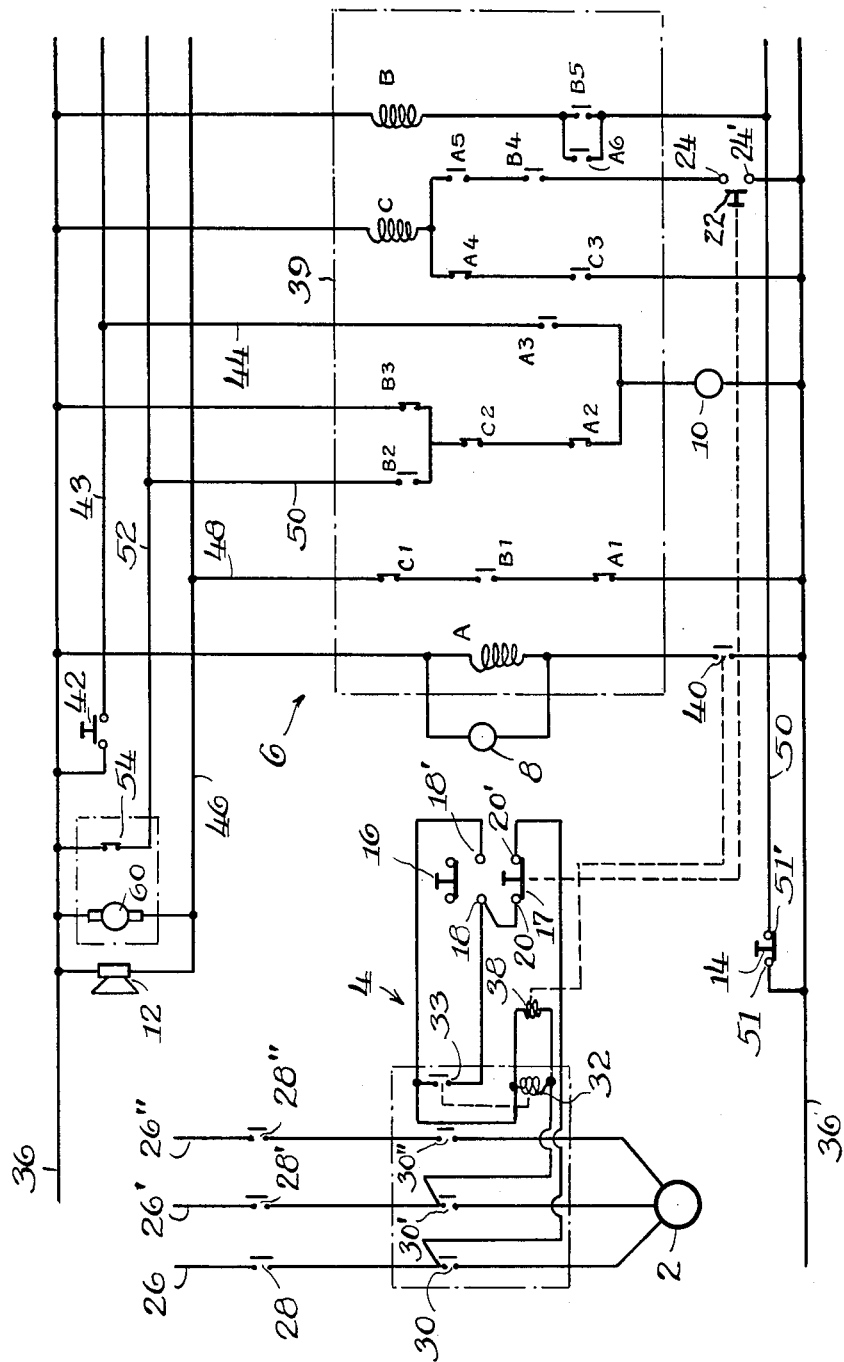

Inventor,
Robert J. Marmorstone,
By: Russell E. Hatto
Atty.

Fig. 2

| CONDITION | STARTER COIL 32 | RED LAMP 8 | AMBER LAMP 10 | HORN 12 | "A" RELAY | "B" RELAY | "C" RELAY |
|---|---|---|---|---|---|---|---|
| MOTOR RUNNING | ENERGIZED | STEADY-ON | OFF | OFF | ENERGIZED | ENERGIZED | DEENERGIZED |
| ABNORMAL MOTOR STOPPAGE (OVERLOAD, ETC.) | DEENERGIZED | OFF | FLASHING | ON | DEENERGIZED | ENERGIZED | DEENERGIZED |
| ABNORMAL "STOP" ACKNOWLEDGED | DEENERGIZED | OFF | STEADY ON | OFF | DEENERGIZED | DEENERGIZED | DEENERGIZED |
| MOTOR RUNNING | ENERGIZED | STEADY ON | OFF | OFF | ENERGIZED | ENERGIZED | DEENERGIZED |
| MOTOR MANUALLY STOPPED AT P.B. STATION | DEENERGIZED | OFF | OFF | OFF | DEENERGIZED | ENERGIZED | ENERGIZED |
| LAMP TEST | ENERGIZED | STEADY ON | STEADY ON | OFF | ENERGIZED | ENERGIZED | DEENERGIZED |

Inventor
Robert J. Marmorstone,
By Russell E. Hatt
Atty

United States Patent Office 2,752,588
Patented June 26, 1956

2,752,588

MOTOR CONTROL ANNUNCIATOR

Robert J. Marmorstone, Chicago, Ill., assignor to Panellit, Inc., Skokie, Ill., a corporation of Illinois Application November 2, 1954, Serial No. 466,293

11 Claims. (Cl. 340—248)

The present invention relates to annunciator or alarm systems, and more particularly to annunciator systems for indicating the abnormal stoppage of an electric motor, although many aspects of the invention have a broader application.

Where a large number of electric motors are to be started and stopped frequently and at different times, it is often difficult for an operator to ascertain whether a particular motor was stopped intentionally or whether the stoppage was due to abnormal conditions, such as a break down in the electrical control circuit of the motor or in the system supplying power thereto. Of course, where a single-pole, double-throw switch is utilized to turn each motor on and off, the stoppage of a motor having its on-off switch in the "on" position would indicate to an operator viewing the motor switch that the motor was stopped due to abnormal conditions. However, this is not readily possible where the apparatus is controlled by push button type switches wherein separate push buttons which are momentarily depressed to control the motor are utilized for start and stop operation.

One of the objects of this invention is to provide an annunciator system used in conjunction with a start-stop push button station of the above type, and which provides a maximum of information to the operator so that the operator may readily ascertain whether the motor or other associated apparatus is energized, or deenergized manually, or deenergized due to some abnormal condition.

Another object of this invention is to provide an annunciator system of the aforementioned type wherein a light is provided which indicates the energized or deenergized condition of the motor or other apparatus and another light is utilized to indicate whether stoppage of the motor is due to normal or abnormal conditions.

Still another object of the invention is to provide an annunciator system of the above type which includes a control for the fault indicating light which changes the light indication when the fault has been acknowledged.

A still further object of the invention is to provide an annunciator system of the above type which utilizes relay control circuits of utmost simplicity and reliability.

Other advantages and objects of the present invention will become apparent upon making reference to the specification to follow, taken in conjunction with the drawings illustrating a preferred, exemplary embodiment of the invention.

It should be understood that the broader aspects of the invention contemplate numerous modifications of the specific embodiment disclosed, although the disclosed embodiment forms a preferred aspect of the invention.

In the drawings:

Fig. 1 is a circuit diagram of an annunciator system associated with a motor control circuit; and Fig. 2 is a chart illustrating the operation of the circuit of Fig. 1.

The embodiment of the invention illustrated in Fig. 1 shows an electric motor 2 controlled from a conventional starter circuit 4, and an annunciator system generally indicated by the reference numeral 6 for indicating when the motor 2 is stopped and the general cause of such stoppage. The annunciator system includes a red light source 8 which indicates whether the motor is running or is stopped, an amber light 10 and an audible alarm 12 both of which are energized when the motor is stopped due to some abnormal condition, such as failure of power source supplying the motor or a circuit break down occurring between the source of power and the motor 2. Means to be described hereinafter is provided for flashing the amber light upon the occurrence of an abnormal fault to indicate an unacknowledged fault. The function of the audible alarm 12 is to attract the operator's attention to a panel (not shown) containing the aforementioned indicator lights. By depressing an acknowledge push button 14, the audible alarm 12 is shut off and the flashing indication of the alarm light 10 is changed to a steady-on condition which indicates that the fault has been acknowledged. As long as the motor remains deenergized, the red light 8 remains unlighted.

As soon as the motor 2 begins operating again, the steady-on amber light 10 becomes automatically extinguished and the red light 8 is lighted to indicate that the motor is running.

Although the drawing illustrates the use of the invention in connection with a single motor, it should be understood that the invention may be utilized for indicating the operating condition of a large number of motors or other apparatus. In such case, separate annunciator units utilizing lights similar to 8 and 10 are associated with each different motor or other apparatus, and all of these lights are mounted preferably on the front of the aforementioned panel (not shown), so that the operator can see at a glance the operating conditions of a large number of such apparatuses. In such case, a single audible alarm and acknowledge push button may be used for all of the annunciator units. These annunciator units are energized from a common source of power which is completely independent of the power source supplying the motor 2 so that a failure in the power source supplying the motor will not interfere with the operation of the annunciator system.

The details of the circuitry illustrated in the drawings will now be described.

The starter circuit 4 may be any conventional starter circuit, but preferably one utilizing separate depressible push button contacts 16 and 17, respectively, for start and stop operation. Depression of the start push button contact 16 bridges a spaced set of stationary contacts 18—18'. A set of spaced stationary contacts 20—20' are normally bridged by the stop push button contact 17.

In accordance with the present invention, the stop push button contact 17 is ganged with a movable push button contact 22 having associated stationary spaced contacts 24—24' to form a double pole make-before-break switch assembly, for reasons which will be explained hereinafter. Suffice it to say now that depression of the stop push button contact 17 results in the push button 22 bridging the associated contacts 24—24' before the stop push button contact 17 separates from the associated spaced contacts 20—20'.

The motor illustrated in the drawing is operated from a three phase supply line 26—26'—26" including overload circuit breaker contacts 28—28'—28". The circuit breaker contacts are connected to respective starter circuit contacts 30—30'—30", and the latter contacts are connected, respectively, to the three input terminals of the electric motor 2. The start circuit contacts 30—30'—30" are controlled by a starter coil 32 the terminals of which are connected to two of the supply lines 26 and 26' on the line side of the starter circuit contacts 30 and 30'. Momentary depression of the starter push button contact 16 then energizes the starter coil 32 which is maintained in an energized state by holding contacts 33 shunted across the starter push button contacts 18—18'. Energization of the starter coil 32 closes the contacts 30—30'—30" to couple energizing potential to the motor 2. Depression of the stop push button contact 17 deenergizes the starter coil 32 and opens the contacts 30—30'—30" and the holding contacts 33 to deenergize the motor 2.

The annunciator circuit 6 is operated from a source of power connected to power lines 36—36'. This source of power may be either D. C. or A. C., and is a separate source of power from the power supplying the motor 2, so that failure of the power supplying the motor 2 will not interrupt the operation of the annunciator circuit 6.

The annunciator system is controlled by a starter circuit relay 38 in the motor control circuit, which relay is connected across the starter coil 32 so that energization of the motor 2 results in the energization of the relay 38. This establishes an energizing circuit for the motor condition indicating light 8 which circuit includes the annunciator power line 36, the light 8, contacts 40 of the starter circuit relay 38, and the other annunciator power line 36'. The relay 38 also establishes circuits through a plug-in unit 39 containing a number of relays and associated contacts which control the operation of the lights 8 and 10 and the audible alarm 12. The plug-in unit 39 is mounted behind the light panel mounting the lights 8 and 10. Where a number of separately controlled motors are involved, a plug-in unit similar to unit 39 is mounted on the aforementioned panel and is similarly connected to the buses or lines indicated by the broken lines at the right hand side of Fig. 1 and to their indicating lights.

A slave relay A in the plug-in unit 39 is connected in parallel with the light 8 so that the energization of the control relay 38 also establishes an energization circuit for the slave relay A. An energization circuit for an acknowledge relay B in the plug-in unit 39 is also established through a circuit including supply line 36, relay coil B, normally open contacts A6 of the slave relay A, line 50 common to all associated annunciator units, and the normally closed acknowledge push button contacts 51—51'. (In the discussion to follow, any reference to a set of relay contacts by a letter and a number indicates that the contacts are those of the relay identified by the corresponding letter.) Normally open holding contact B5 in parallel with contacts A6 maintain or hold the energization of the B relay until the acknowledge push button 14 is depressed which, as before stated, changes the flashing condition of alarm light 10 to a steady-on condition.

The energization of relay A also establishes a lamp test light circuit for testing the operation of the alarm light via a circuit including the annunciator power line 36, normally open lamp test push button contact 42, the common test line or bus 43 leading to all of the plug-in units, the branch line 44 leading to the plug-in unit 39, normally open contacts A3 and alarm light 10.

When the motor is stopped due to a failure of power by means other than by the depression of the stop push button 17, the starter circuit relay 38 becomes deenergized due to a failure of power to starter coil 38, which in turn deenergizes the slave relay A as the contacts 40 of the control circuit relay 38 open. The deenergization of the slave relay A establishes an energization circuit for the audible alarm 12 and a flasher motor 60 is parallel with the audible alarm 12, and also establishes an energization circuit for the alarm light 10. The energization circuit for the audible alarm 12 extends from the annunciator power line 36, through the parallel circuit of the flasher motor 60 and the audible alarm 12, the common line or bus 46 leading to a branch line 48 associated with each plug-in annunciator unit, then through normally closed contacts C1 of an alarm preventing relay C which is normally in a deenergized condition, through the then closed contacts B1, and normally closed contacts A1 connected to the other annunciator power line 36'. The energization circuit for the alarm light 10 extends from annunciator power line 36 through vibrating flasher contacts 54 which are alternately opened and closed by the flasher motor 60, a common flasher switch line or bus 52 connecting with branch lines 50 in each annunciator unit, the then closed (normally open) contacts B2, normally closed contacts C2 and A2, and through the alarm light 10 leading to the other annunciator power line 36'. Thus, the fault occurring in the system which interrupts power to the motor results in the sounding of the audible alarm 12 and the flashing of the alarm light 10.

The operator being attracted to the control panel depresses the acknowledge push button 14 which interrupts the energization circuit of the acknowledge relay B. The deenergization of the relay B opens the contacts B2 in the energization circuit of the alarm light to disconnect the alarm light from the flasher motor line 52 and establishes a circuit connected directly to the annunciator power line 36 via closed contacts B3. The alarm light 10 remains in its steady-on condition until the motor 2 is energized by the correction of the fault and the depression of the start push button contact 16. The resultant energization of the starter circuit relay 38 energizes the slave relay A as above explained, which in turn interrupts the energization of the alarm light 10 as the normally closed contacts A2 in the energization circuit of the alarm light opens.

When the stop push button 17 is depressed to stop the motor, an energization circuit for the alarm preventing relay C is established through a circuit extending from the annunciator power line 36, through the relay coil C, normally open contacts A5 (which is one of a set of make-before-break contacts which remains closed momentarily following the deenergization of relay A until another set of contacts A4 in a companion circuit closes), normally open contacts B4 of the then energized B relay, and the closed stop push button contact 22 leading to the other power line 36'. Note that stop push button contacts 22 are connected in make-before-break fashion so that the closing of contacts 22—24—24' is sure to precede the deenergizing of relay A and the opening of contacts A5. Otherwise the relay C would not be energized if the opening of contacts A5 preceded the closing of contact 22.

Immediately upon the energizing of relay C, a holding circuit for relay C is established including normally closed contacts A4 and normally open holding contacts C3. The closing of holding contacts C3 is followed immediately by the closing of contacts A4 in series therewith, as relay A becomes deenergized. The contacts A4 and C3 shunt the aforementioned series contact circuit including contacts A5, B4 and 22. Without this make-before-break contact arrangement of contacts A5 and A4, the opening of contacts A5 just a fraction of a second before the closing of contacts A4 would deenergize relay C and open contacts C3 in the holding circuit of relay C. The energization of the C relay opens contacts C1 and C2, respectively, in the energization circuits of the audible alarm 12 and the alarm light 10 to prevent their operation when the motor is manually stopped by the depression of the stop push button 17.

When the motor is started by the depression of the start push button 16, relay A will energize which will open normally closed contacts A4 in the holding circuit of alarm preventing relay C to deenergize the same. The energization circuits for the alarm light 10 and alarm horn 12 are then prepared by the closing of normally closed contacts C2 and C1, respectively.

The present invention has thus provided a simple and reliable annunciator system for indicating abnormal stoppage of motors or other electrically operated apparatus. It should be understood, however, that numerous modifications may be made in the preferred embodiment described without deviating from the broader aspects of the invention.

I claim:

1. In combination with a control circuit having means for energizing and deenergizing apparatus to be controlled, condition responsive means which is actuated by the energizing and deenergizing of said apparatus, a condition indicating means controlled by said condition responsive means for indicating the condition of said apparatus, an annunciator system for indicating the deenergization of said apparatus by means other than by said control and including an alarm indicating means and an alarm preventing means, said condition responsive means being connected to operate said alarm indicating means when said apparatus is deenergized, and means actuated by the operation of said control means to its position which deenergizes said apparatus for rendering said alarm preventing means operative to prevent the operation of said alarm indicating means.

2. In combination with a start and stop control switch means for a given apparatus, an annunciator system including condition indicating means for indicating the operating condition of the apparatus, a fault indicating means for indicating the abnormal stoppage of said apparatus, switch means for operating said fault indicating means when the apparatus is stopped, second switch means for preventing the operation of said fault indicating means, third switch means responsive to the operation of said start and stop control switch to its stop condition to render the second switch means operative to prevent the operation of said fault indicating means, switch means responsive to the running of said apparatus to render said second switch means inoperative to prevent the operation of said fault indicating means, and means interconnecting said third switch means and the stop control switch means to form a make-before-break switch arrangement wherein said second switch means operates before the first-mentioned switch means can be operated.

3. In combination with a start and stop control means for a given apparatus, an annunciator system including a condition indicating light connected to indicate the operating condition of the apparatus, a fault indicating light for indicating the abnormal stoppage of said apparatus, means for operating said second light when the apparatus is stopped, control means for preventing the operation of said second light, and means responsive to the operation of said start and stop control to its stop position to render said control means operative to prevent the operation of said second light.

4. In combination with a control for operating an apparatus to either of two conditions, an alarm for indicating a change in said apparatus from a first to a second condition by means other than by said control, an energization circuit for said alarm including a first and second set of contacts, the first set of said contacts being arranged to effect the energization of said alarm when the apparatus is in said second condition, the second set of said contacts being arranged to prepare said energizing circuit in one position of operation of the contacts and to prevent the energization of said alarm in a second position thereof, condition responsive relay means arranged to be automatically positioned into first and second positions when said apparatus is respectively in said first and second conditions, said condition responsive relay means connected to operate said first set of contacts to their alarm energizing position when said apparatus is in said second condition, alarm preventing relay means for controlling the operation of said second set of contacts, an energization circuit for said alarm preventing relay means including a first set of contacts operated by said condition responsive relay means which contacts in the second position of said latter relay actuate said alarm preventing relay means into a position where said second set of contacts are in their circuit preparing position, said energization circuit for said alarm preventing relay means including a second set of contacts which in one position are adapted to actuate the alarm preventing relay means into its position which actuates said first-mentioned second set of contacts to their position which prevents the energizing of said alarm, and means for operating said second set of contacts in the energization circuit of said alarm preventing relay means to said one position thereof in response to the operation of said control to a position which effects the second condition of said apparatus, said last mentioned means including means for preventing the operation of said condition responsive relay means until the actuation of the said second set of contacts in the energization circuit of said alarm preventing relay means into said one position.

5. In combination with a start-stop control having separate manually operable switches for start and stop operation, a system for giving information on whether the associated controlled apparatus is stopped manually or by some abnormal condition, comprising a trouble indicating means, an energization circuit for said trouble indicating means including a source of operating voltage and two sets of series connected contacts in series with said trouble indicating means, means for closing one set of said contacts when said apparatus is stopped and for opening the same when said apparatus is operating, the stop switch of said start-stop control being a make-before-break switch having two sets of contacts, one set being operative to stop said apparatus and the other set being operative before the latter set to effect the opening of the other set of contacts in the energization circuit of said trouble indicating means.

6. In combination with an electrical control circuit having start and stop switch means for connecting and disconnecting a source of energization potential, respectively, to and from an apparatus to be controlled, an annunciator system including a visual alarm means, an audible alarm means, and an alarm preventing means, means for operating said visual and audible alarm when there is a failure of power in the input to said apparatus, manually operable acknowledge means for stopping said audible alarm and changing the alarm indication of said visual alarm means, means responsive to the operation of said start and stop switch means to its stop position to render said alarm preventing means operative to prevent the operation of said audible and visual alarm indicating means, and means responsive to the presence of operating potential in the input to said apparatus to render said audible and visual alarm means and said alarm preventing means inoperative.

7. In combination with an electrical control circuit having start and stop switch means for connecting and disconnecting a source of energization potential, respectively, to and from an apparatus to be controlled, an annunciator system including an alarm means and an alarm preventing means, means for operating said alarm means when there is a failure of power in the input to said apparatus, manually operable acknowledge means for changing the alarm indication of said alarm means, means responsive to the operation of said start and stop switch means to its stop position to render said alarm preventing means operative to prevent the operation of said alarm means, and means responsive to the presence of operating voltage in the input to said apparatus to render said alarm means and said alarm preventing means inoperative.

8. In combination with a start-stop control for start and stop operation, a system for giving information on whether the associated controlled apparatus is stopped manually or by some abnormal condition comprising a trouble indicating means, an energization circuit for said trouble indicating means including a source of operating voltage and two sets of series connected contacts in series with said trouble indicating means, means for closing one set of said contacts when said apparatus is deenergized and for opening the same when said apparatus is operating, and means for effecting the opening of the other of said set of contacts when said start-stop control is operated to said stop position to prevent energization of said trouble indicating means.

9. In combination with a start-stop control for starting and stopping a given apparatus, a condition responsive relay electrically connected to the apparatus so that the energized condition of the relay corresponds with the energized condition of the apparatus, an alarm for indicating the stoppage of said apparatus by means other than by said control, an alarm preventing relay having an energization circuit with two parallel branches in series with said latter relay which branches energize the relay when either is closed, one of said branches including a set of normally closed contacts of said condition responsive relay in series with a set of normally open holding contacts for said alarm preventing relay, the other branch having a set of contacts which are closed when said control is moved into a position to effect said one condition and a set of normally open contacts of said condition responsive relay, an energization circuit for said alarm, and said alarm energization circuit including normally closed sets of contacts of both of said relays connected in series so that de-energization of these relays will energize the alarm and energization of either relay will prevent operation of the alarm.

10. In combination with an electrical control circuit having start and stop switch means for connecting and disconnecting a first source of energization potential, respectively, to and from an apparatus to be controlled, first relay means responsive to the presence and absence of energization voltage to the input of said apparatus, an annunciator system for indicating the deenergization of said apparatus by means other than by said switch means, a second source of energizing potential for operating said annunciator system which potential source is independent of said first source of potential, said annunciator system including an alarm indicating means, an alarm preventing relay means, respective energization circuits for said alarm indicating and alarm preventing means and including said second potential source, said first relay means being connected to establish the energization circuit for said alarm indicating means when there is a failure of power in the input to said apparatus and to render said alarm preventing relay means inoperative when said first potential source is connected to the input to said apparatus, and switch means actuated by the operation of said start and stop switch means to its stop position for rendering said alarm preventing means operative to prevent the operation of said alarm indicating means.

11. In combination with a start-stop control having separate manually operable switches for start and stop operation, respectively, the stop switch being a make-before-break switch having two sets of contacts, one set being operated to stop the associated apparatus, the other set operating prior to said one set, trouble indicating means, an energization circuit for said trouble indicating means including a source of operating voltage and two sets of series connected contacts in series with said trouble indicating means, means for maintaining one of said sets of contacts closed while said apparatus is deenergized and for maintaining the same open while said apparatus is operating, a relay for operating the other set of series connected contacts into a closed position when the relay is unenergized and into the open position when the relay is energized, an energization circuit for said relay comprising a source of operating voltage and two parallel branches between said source of voltage and said relay, one of said branches including the set of contacts of said make-before-break switch which are first operative and in series therewith a second set of contacts which are maintained closed while said apparatus is operating and which are maintained open when said apparatus is not operating, the other of said branches having two sets of series connected contacts, one set being a holding contact of said relay and the second set of contacts being closed when said apparatus is not in operation and being open when said apparatus is in operation, said second sets of contacts in said parallel branch circuits being arranged for make-before-break operation with respect to each other.

References Cited in the file of this patent

UNITED STATES PATENTS 2,600,132     Seaton                June 10, 1952